Patented Dec. 1, 1936

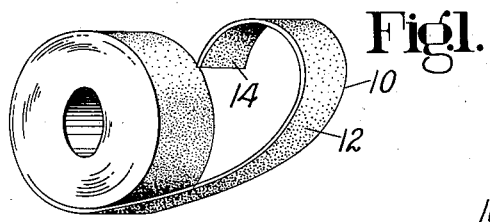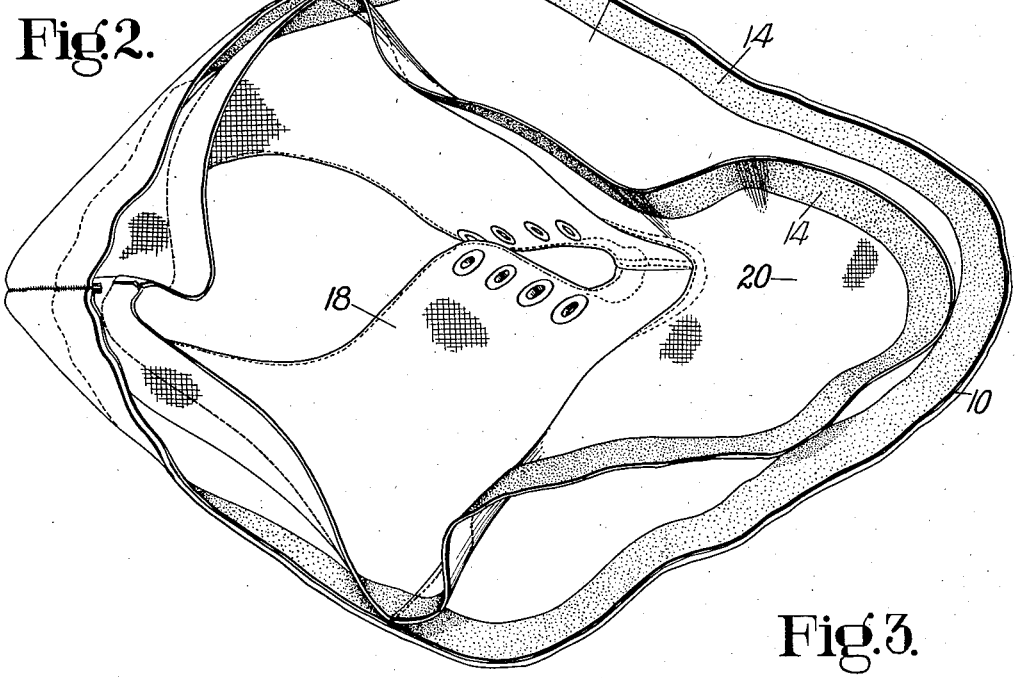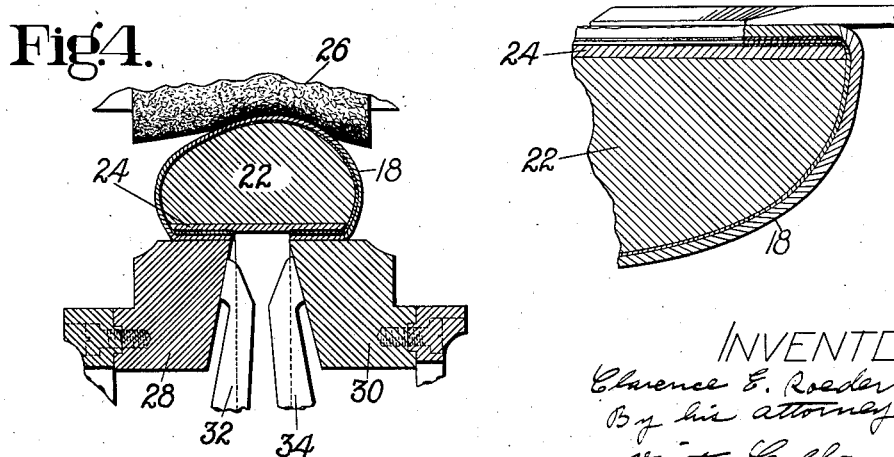

2,062,528

UNITED STATES PATENT OFFICE 2,062,528

METHOD OF MAKING SHOES

Clarence E. Roeder, Melrose, Mass., assignor to United Shoe Machinery Corporation, Paterson, N. J., a corporation of New Jersey Application August 15, 1935, Serial No. 36,350

8 Claims. (Cl. 12—142)

This invention relates to shoes and to the manufacture thereof and is illustrated herein with reference to the manufacture of shoes the uppers of which are to be secured in lasted position by adhesive.

In shoes of the type referred to it is customary to spray or otherwise apply wet cement between the plies of the upper materials and to the inner side of the lining of the upper just prior to the lasting operation. Obviously, this procedure requires a skilled operative and even then cannot be performed without danger of getting cement on parts of the upper or insole where it is not desired. Moreover, if too much cement should happen to be applied some of it may squeeze out during the lasting operation and thus stain the shoe or seriously interfere with subsequent operations thereon.

Objects of the present invention are to provide an improved method of lasting shoe uppers by adhesive which will eliminate the objectionable features referred to and which will be efficient, economical and easy to carry out.

To this end the invention provides, in accordance with one aspect, an improved method of applying adhesive to a shoe upper. As illustrated, double-coated adhesive tape is used, this tape preferably having one side tacky or agglutinant at normal temperature and the other side coated with thermoplastic material which is normally non-tacky but is capable of being rendered adhesive by heat. The tape is applied lengthwise to the inner side of the marginal portion of the upper, with its tacky surface against the upper. When the shoe is lasted the upper is worked over the edge of the insole into lasted position and, while held in such position, is subjected to heat sufficient to activate the thermoplastic material on the inner or exposed side of the tape. This causes the tape to adhere to the outer surface of the insole and thereby produce a firm bond between the insole and upper.

In order that the several layers of a multi-ply upper may be caused to adhere to each other as well as to the insole the invention also provides for the application of double-coated tape between the layers of the upper. As herein illustrated, a two-ply upper, comprising an outer layer and a lining, has adhesive tape stuck to the inner side of the marginal portion of its outer layer, this tape having its exposed surface coated with thermoplastic material which is non-tacky at normal temperature but is adapted to become tacky under heat to cause the outer layer to adhere to the lining during the lasting operation.

With the above and other objects and features in view the invention will now be described in detail in connection with the accompanying drawing and thereafter pointed out in the claims.

In the drawing,

Fig. 1 is a view of a roll of the tape used in the present method;

Fig. 2 is a view of a multi-ply shoe upper with a strip of the tape applied to the inner side of the marginal portion of the outer layer and a strip applied to the inner side of the marginal portion of the lining;

Fig. 3 is a longitudinal sectional view of the toe end of a shoe showing the upper of Fig. 2 held in overlasted positon by a wiping member; and Fig. 4 is a transverse sectional view of the shoe showing the sides of the upper wiped in and held in lasted position by wipers.

The method of lasting shoes illustrated herein comprises applying double-coated adhesive tape to the margin of a shoe upper and securing the upper in lasted position to an insole by means of such tape. The roll of tape 10 illustrated in Fig. 1 preferably comprises a relatively narrow strip of fabric material coated on its outer side with an adhesive 12 such, for example, as rubber cement mixed with rosin so that it is tacky at normal temperature and will stick when cold upon the application of sufficient pressure. The inner side of the tape 10 is coated with thermoplastic material 14 such, for example, as gutta percha which is non-tacky at normal temperature but which may be rendered tacky or agglutinant by the application of heat.

A strip of the tape 10 is stuck to the inner side of the margin of the outer or leather layer 16 of a multi-ply shoe upper 18 by the tacky side 12 of the tape. The tape 10 may be applied to the outer layer of the upper by hand or, if desired, by means of a machine of the type disclosed in Letters Patent of the United States No. 1,549,376, granted August 11, 1925, on an application filed in the name of Walter P. Osgood. Since the adhesive material 12 is tacky at normal temperature it will readily stick to the upper when cold upon the application of pressure. The thermoplastic material 14 of the strip 10 will be exposed, as shown in Fig. 2, and, since this material is not tacky at normal temperature, it will not stick to the inner layer or lining 20 of the upper.

Another strip of the tape 10 is applied to the inner side of the marginal portion of the lining 20 with the surface which is coated with thermoplastic material 14 exposed. If desired the tapes can be thermoplastic on one side and without adhesive on the other and they can be attached lengthwise to the marginal portions of the upper and lining by stitches with the thermoplastic side exposed. It would also be within the scope of the invention to secure the tapes to the upper materials by both adhesive and stitches. Another alternative would be to use double-coated adhesive tape which is tacky or agglutinant at normal temperature on both sides, apply this tape lengthwise to the inner sides of the outer layer of the upper and the lining, and carry out the subsequent steps of the method in the manner to be described. Tape which is adhesive on both sides, however, might not be quite so satisfactory under all conditions because of the danger of the exposed side sticking to other parts of the shoe before the members are located in proper positions. After the tapes have been applied the upper 18 is assembled on a last 22 in the usual manner with an insole 24 and the marginal portions of the upper are pulled over and temporarily held in position by tacks. The shoe is now ready for the lasting operation.

As herein illustrated, the toe and heel portions of the upper may be lasted in a bed-lasting machine, such for example, as that disclosed in Letters Patent of the United States No. 1,018,477, granted February 27, 1912, on an application filed in the name of Matthias Brock. The toe and heel-embracing wipers of the machine should be heated in any well-known or convenient manner so that the thermoplastic material on the inner surfaces of the lasting tapes will be activated to cause the outer layer of the upper to stick to the inner layer or lining and also to cause the lining to stick to the margin of the insole. Moreover, the wipers should be left in wiped-in position for a time sufficient to activate the thermoplastic material and thus cause the various layers to become firmly bonded together. If the adhesive tape is tacky on both sides the heat can be dispensed with.

The margins of the upper at the opposite sides of the shoe may be lasted with the aid of a machine of the type disclosed in an application for Letters Patent Serial No. 708,722, filed January 29, 1934, in the name of Charles F. Pym. As disclosed in that application, the shoe is supported against upwardly directed pressure applied by a pair of wipers 28, 30 by shoe-engaging members comprising a heel post (not shown) and a toe rest or roll 26 so that the shoe is under some pressure after the wipers have worked the marginal portions of the upper over the edges of the insole and are wiping them into lasted position. The edge portions of the upper are gripped during the overwiping operation by grippers 32, 34 cooperating respectively with the wipers 28 and 30. The wipers are heated as described in the application referred to so that the thermoplastic material on the inner sides of the tapes will be activated to cause the lining to adhere firmly to the margin of the insole and outer layer of the upper to adhere to the lining. After the upper has been wiped into lasted position, as shown in Fig. 4, the shoe is allowed to remain under pressure for a time sufficient to cause the several layers of materials to become thoroughly bonded together. As stated above, if double-coated adhesive tape is used which is tacky on both sides the heat may be omitted since the upper materials will stick to each other and to the insole merely upon the application of pressure. When the shoe is removed from the machine the entire overlasted marginal portion of the upper will be permanently stuck to the margin of the insole so that no trimming operation will be required. The hollow or depression inwardly of the edges of the over-lasted margins of the upper may, if necessary or desirable, be filled with filling material in the usual manner to level the shoe bottom, a usual shank stiffener may be applied and an outsole may be attached either by cement or stitches to complete the construction of the shoe.

It is within the scope of the invention to stick the double-coated adhesive tape to the marginal portion of the insole instead of to the inner side of the lining of the upper if this should be more convenient or desirable, the upper being then worked over the taped margin of the insole and pressed against said margin by heated wipers which activate the thermoplastic material on the exposed side of the tape and thus cause the upper to become permanently bonded to the insole.

Having described my invention, what I claim as new and desire to secure by Letters Patent of the United States is:

1. That improvement in methods of making shoes which consists in locating a tape lengthwise between the marginal portion of a shoe upper and the marginal portion of the outer face of an insole relatively to which the upper is to be secured in lasted position, said tape being normally non-tacky but being rendered tacky by heat, working the upper into lasted relation to the insole, and applying heat to the marginal portion of the upper to render the tape adhesive and thus cause the upper to become permanently stuck to the insole.

2. That improvement in methods of making shoes which consists in assembling a shoe upper and an insole on a last, securing adhesive tape to the portion of the margin of one of said members which will be parallel to the last bottom in the lasted shoe, the exposed surface of said tape being normally non-tacky but being rendered adhesive by heat, working the upper into lasted relation to the insole, and applying heat to the overlasted margins of the upper to render the tape adhesive and thus cause the upper to become permanently attached to the insole.

3. That improvement in methods of making shoes which consists in assembling an insole and a shoe upper on a last, securing tape lengthwise to the lasting margin of one of said members, the exposed surface of said tape being coated with a thermoplastic material which is non-tacky at normal temperature but which can be rendered tacky by heat, working the lasting margin of the upper into lasted relation to the lasting margin of the insole, and applying heat to the overlasted margin of the upper only to activate the thermoplastic material on the tape and thus cause the upper to become permanently stuck to the lasting margin of the insole.

4. That improvement in methods of making shoes which consists in securing a tape lengthwise to the inner side of the marginal portion of a shoe upper, the exposed surface of said tape being normally non-adhesive but becoming adhesive upon the application of heat, assembling the upper with an insole on a last, working the upper into lasted relation to the insole, and applying heat to the marginal portion of the upper to render the tape adhesive and cause said marginal portion to become permanently attached to the insole.

5. That improvement in methods of making shoes which consists in cementing a tape lengthwise to the inner side of the marginal portion of a shoe upper, the exposed surface of said tape being coated with a non-sticky thermoplastic material which may be rendered sticky by heat, assembling the upper with an insole on a last, working the marginal portion of the upper into lasted position over the margin of the insole, and while holding the upper in such position applying heat to its marginal portion to activate the thermoplastic material and to cause the upper to become permanently stuck to the insole.

6. That improvement in methods of making shoes which consists in securing lengthwise between the marginal portions of the layers of a multi-ply upper tapes which are normally non-adhesive but which may be rendered sticky by heat, securing a similar tape lengthwise to the inner side of the marginal portion of the inner layer of said upper, assembling the upper and an insole on a last, working the marginal portions of the plies of the upper into overlasted relation to the insole, and applying heat to said marginal portions to render the tapes agglutinant and thereby to cause the layers of the upper to stick to each other and to the margin of the insole.

7. That improvement in methods of making shoes which consists in securing lengthwise to the inner side of the marginal portion of the outer layer of a multi-ply upper a tape the exposed surface of which is normally non-adhesive but may be rendered adhesive by heat, securing the same kind of tape lengthwise to the inner side of the marginal portion of the lining of said upper, assembling the upper and an insole on a last, working the marginal portions of the plies of the upper into lasted relation to the insole, and applying heat to said marginal portions to render the tapes adhesive and thereby to cause the outer layer of the upper to stick to the lining and the lining to stick to the margin of the insole.

8. That improvement in methods of making shoes which consists in sticking lengthwise to the inner side of the marginal portion of the outer layer of a multi-ply upper an adhesive tape having a tacky side and a side normally non-tacky but capable of becoming tacky under heat, sticking a similar tape lengthwise to the inner side of the marginal portion of the lining of said upper, assembling the upper on a last with an insole, working the marginal portions of the outer layer and lining into lasted relation to the insole, and, while holding said portions under pressure in such position, applying heat thereto, thereby rendering the non-tacky sides of the tapes sticky to cause the outer layer of the upper to adhere to the lining and the lining to become permanently stuck to the insole.

CLARENCE E. ROEDER.